US008334668B2

(12) United States Patent
Wang et al.

(10) Patent No.: US 8,334,668 B2
(45) Date of Patent: Dec. 18, 2012

(54) MACHINE MOTION CONTROL SYSTEM

(75) Inventors: Jia-Bin Wang, Shenzhen (CN); Hua-Yong Xu, Shenzhen (CN); Guo-Jun Yu, Shenzhen (CN); Teng-Tsung Huang, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 240 days.

(21) Appl. No.: 12/898,678

(22) Filed: Oct. 5, 2010

(65) Prior Publication Data
US 2011/0295428 A1   Dec. 1, 2011

(30) Foreign Application Priority Data
May 27, 2010   (CN) .......................... 2010 1 0184851

(51) Int. Cl.
*G05B 11/01* (2006.01)
(52) U.S. Cl. .......... 318/560; 318/574; 318/575; 318/51; 700/56; 700/275; 700/114; 701/36; 73/808; 345/442
(58) Field of Classification Search .................. 318/574, 318/575, 560, 51; 700/56, 275, 114; 324/500–537, 324/750–760; 701/36; 73/808; 345/442
See application file for complete search history.

(56) References Cited

U.S. PATENT DOCUMENTS

| 4,802,365 | A  | * | 2/1989  | Sallberg et al. ............... 73/808 |
| 6,188,190 | B1 | * | 2/2001  | Arakawa ...................... 318/560 |
| 7,183,736 | B1 | * | 2/2007  | Chou et al. ................... 318/575 |
| 7,869,920 | B2 | * | 1/2011  | Mark .............................. 701/36 |
| 2001/0049568 | A1 | * | 12/2001 | Focke et al. .................. 700/114 |
| 2005/0237071 | A1 | * | 10/2005 | Ito et al. ....................... 324/754 |
| 2007/0031131 | A1 | * | 2/2007  | Griffitts ........................ 388/811 |
| 2007/0046677 | A1 | * | 3/2007  | Hong et al. .................. 345/442 |
| 2008/0244151 | A1 | * | 10/2008 | Leung ............................ 711/2 |
| 2009/0189550 | A1 | * | 7/2009  | Sun et al. ...................... 318/51 |

* cited by examiner

*Primary Examiner* — Walter Benson
*Assistant Examiner* — Jorge Carrasquillo
(74) *Attorney, Agent, or Firm* — Altis Law Group, Inc.

(57) ABSTRACT

A machine motion control system includes a number of moving parts for securing test electronic devices, a machine and an axis control card mounted on the machine. The machine includes a number of servo modules and a number of sensing units. The servo modules drive and control the corresponding moving parts on the machine. Each sensing unit is electrically connected to a corresponding moving part; the sensing units are operable to sense and transmit location information of the moving parts and the machine. The axis control card is electrically connected to the moving parts, the machine, and the sensing units. The axis control card receives location information of each moving part and processes the location information to generate a corresponding command signal, and transmits the generated command signal to the servo modules to control and adjust the moving parts.

13 Claims, 2 Drawing Sheets

MACHINE MOTION CONTROL SYSTEM

BACKGROUND

1. Technical Field

The disclosure generally relates to machine motion control systems, and more particularly relates to a machine motion control system for controlling a machine and different moving parts of the machine.

2. Description of the Related Art

Axis control cards are generally used and are installed within different controllers, such as computers, to control corresponding machines and/or moving parts, but cannot be directly installed onto the machines.

However, when the axis control cards are installed within the controllers, they are electrically connected to the controller through a plurality of wires for communication therebetween. Thus, connection and disassembly can be complicated and difficult. Moreover, the axis control cards are expensive, and have poor expandability due to lack of corresponding interfaces.

Therefore, there is room for improvement within the art.

BRIEF DESCRIPTION OF THE DRAWINGS

Many aspects of an exemplary machine motion control system can be better understood with reference to the following drawings. The components in the drawings are not necessarily drawn to scale, the emphasis instead being placed upon clearly illustrating the principles of the exemplary machine motion control system. Moreover, in the drawings, like reference numerals designate corresponding parts throughout the several views. Wherever possible, the same reference numbers are used throughout the drawings to refer to the same or like elements of an embodiment.

DETAILED DESCRIPTION

Figure 1:
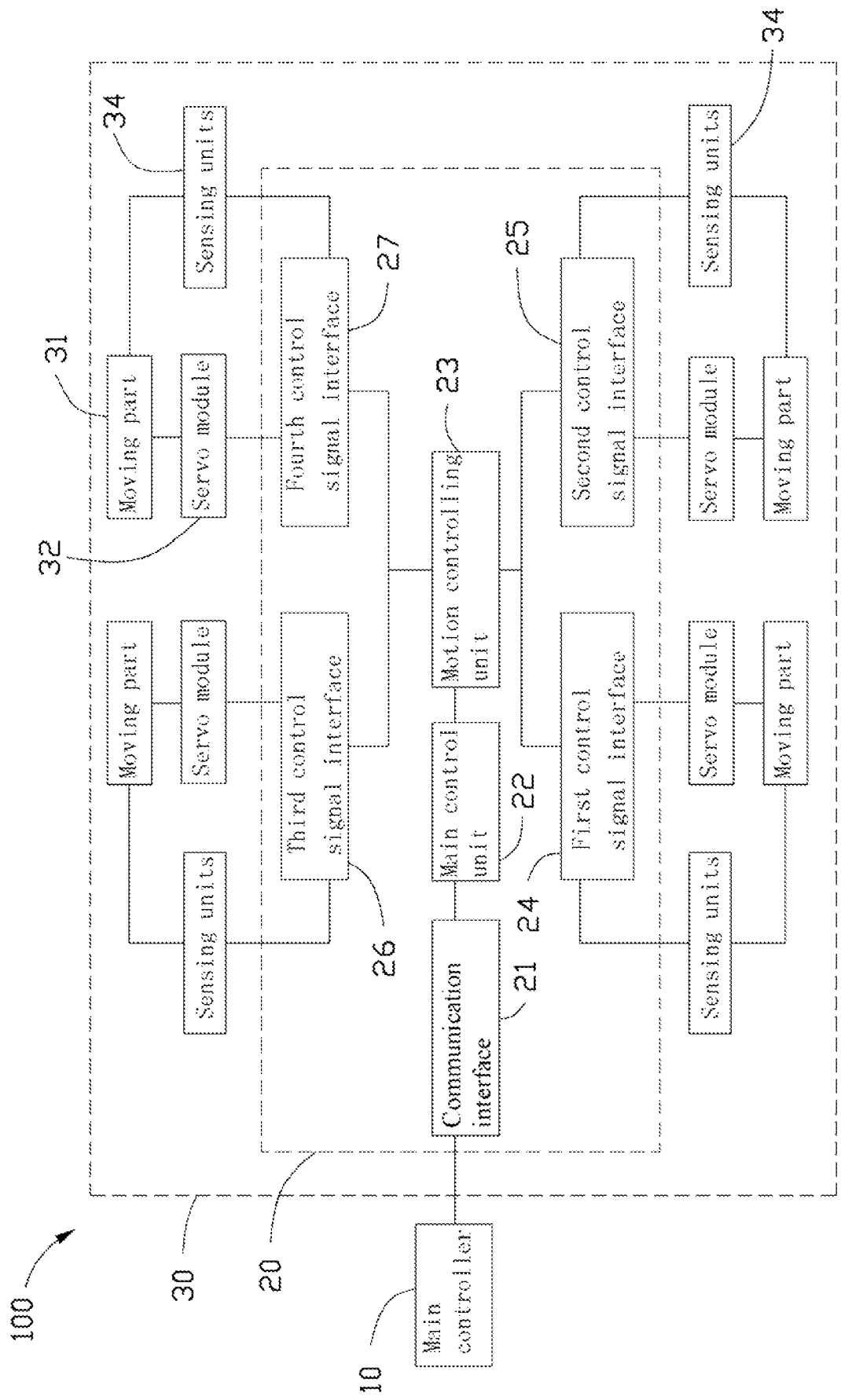
FIG. 1 is a block diagram of a machine motion control system including a main controller, an axis control card, and a machine, according to an exemplary embodiment.

FIG. 1 shows a block diagram of a machine motion control system 100 according to an exemplary embodiment. The machine motion control system 100 includes a main controller 10, an axis control card 20, and a machine 30. The main controller 10 can be a computer and is electrically connected to the axis control card 20. The machine 30 includes a plurality of servo modules 32 for driving moving parts 31 on the machine 30. The axis control card 20 is mounted within the machine 30 and is electrically connected to the main controller 10, the moving parts 31 and the servo modules 32. The main controller 10 can transmit motion instruction to the axis control card 20. The moving parts 31 are capable of securing electronic devices for test.

The axis control card 20 includes a communication interface 21, a main control unit 22, a motion controlling unit 23, a first control signal interface 24, a second control signal interface 25, a third control signal interface 26, and a fourth control signal interface 27. The communication interface 21, the main control unit 22 and the motion controlling unit 23 are electrically connected in series. The first control signal interface 24, the second control signal interface 25, the third control signal interface 26, and the fourth control signal interface 27 are electrically connected to the motion controlling unit 23.

The first control signal interface 24 can be a X-axis motion control signal interface, the second control signal interface 25 can be a Y-axis motion control signal interface, the third control signal interface 26 can be a Z-axis motion control signal interface, and the fourth control signal interface 27 can be an U-axis motion control signal interface. The communication interface 21 can be any of a universal serial bus (USB) interface, an institute of electrical and electronics engineers (IEEE) interface and an external serial ATA (ESATA) interface.

Figure 2:
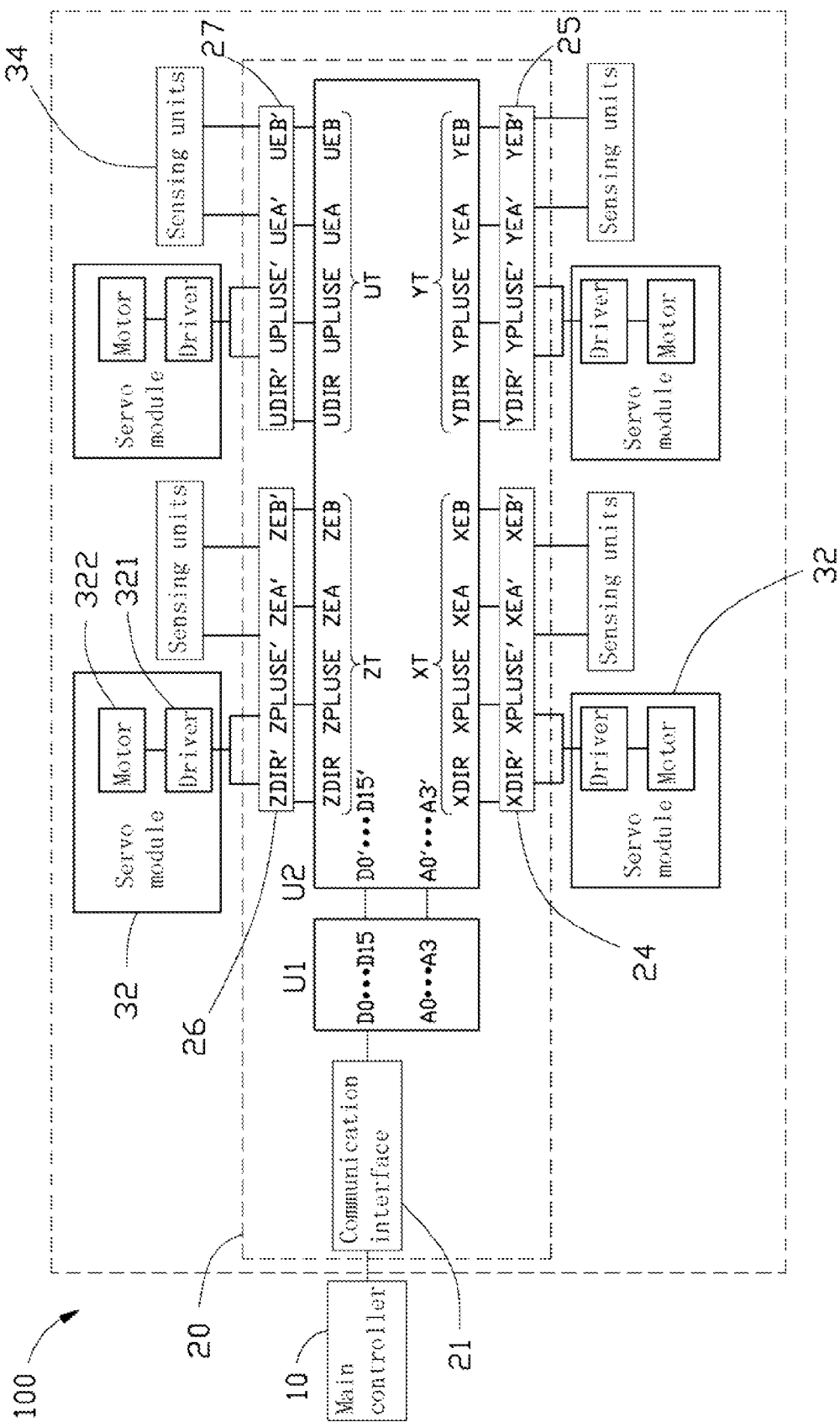
FIG. 2 is a circuit view of one embodiment of the main controller, the axis control card, and the machine of the machine motion control system shown in FIG. 1.

Further referring to FIG. 2, the main control unit 22 includes a main control chip U1. The main control chip U1 can be a C8051 chip and includes data ports D0-D15 and address ports A0-A3. The data ports D0-D15 and the address ports A0-A3 are electrically connected to the motion controlling unit 23. The main control chip U1 is electrically connected to the communication interface 21 and is capable of receiving the motion instruction from the main controller 10 through the communication interface 21 and decoding the received motion instruction. Accordingly, the decoded motion instructions are transmitted to the motion controlling unit 23 through the data ports D0-D15 and the address ports A0-A3.

The motion controlling unit 23 includes a motion control chip U2. The motion control chip U2 can be a MCX314 chip and includes data ports D0'-D15', address ports A0'-A3', and signal transmission ports XT, YT, ZT and UT. The data ports D0'-D15' are electrically connected to the data ports D0-D15 of the main control chip Ul, respectively, to receive and process the decoded motion instruction. The address ports A0'-A3' are electrically connected to the address ports A0-A3, respectively, to receive and process the decoded motion instruction. The signal transmission ports XT, YT, ZT and UT are electrically connected to the corresponding control signal interfaces 24, 25, 26 and 27, respectively, to transmit and receive corresponding command signals.

In this exemplary embodiment, the signal transmission port XT is taken here as an example. The signal transmission port XT includes a direction signal control port XDIR, a pulse signal control port XPULSE and two feedback signal receive ports XEA and XEB. The first control signal interface 24 includes a direction signal receive port XDIR', a pulse signal receive port XPULSE', and two signal feedback ports XEA' and XEB'. The direction signal receive port XDIR' and the pulse signal receive port XPULSE' are electrically connected to the direction signal control port XDIR and the pulse signal control port XPULSE, respectively. The signal feedback ports XEA' and XEB' are electrically connected to the feedback signal receive ports XEA and XEB, respectively, to transmit and receive corresponding command signals.

The machine 30 further includes a plurality of sensing units 34. Each sensing unit 34 mechanically connects or contacts a corresponding moving part 31 and is electrically connected to a corresponding control signal interface. The sensing units 34 are for real-timely sensing location information of the moving parts 31 to monitor the movement of the servo modules 32. The sensed location information is transmitted to the motion control chip U2 through the signal feedback ports (such as XEA', XEB') of the control signal interface (such as the first control signal interface 24). The motion controlling unit 23 receives and processes the location information, such as adjusting the amplitude, frequency and/or pulse number of the location information, through the corresponding feedback signal receive ports (such as XEA and XEB) of the motion control chip U2. Thus, the corresponding direction signal receive port (such as XDIR') and the pulse signal receive port (such as XPULSE') receive the processed location information form the direction signal control port (such as XDIR) and the pulse signal control port (such as XPULSE) and transmit the processed location information to the corresponding servo module 32 to control and adjust the machine 30 and the moving parts 31 in accordance with the command signals from the motion controlling unit 23.

Each servo module 32 includes a driver 321 and a motor 322 electrically connected to a corresponding driver 321. Each driver 321 is electrically connected to the corresponding direction signal control port (such as XDIR') and the pulse signal control port (such as XPULSE') of the control signal interface (such as the first control signal interface 24), and outputs a corresponding driving voltage corresponding to the command signal to the motor 322 to drive the motor 322 according to the predetermined motion instruction. Thus, the motor 322 further drives the moving parts 31 mechanically connected to the motor 322.

In use, the main controller 10 transmits a corresponding motion instruction to the main control unit 22 through the communication interface 21. The main control unit 22 receives and processes the motion instruction, such as decoding the motion instruction, and transmits the processed motion instruction to the motion controlling unit 23 through the data ports D0-D15 and the address ports A0-A3. The motion controlling unit 23 receives and processed the processed motion instruction, and generates a corresponding command signal. The command signals are transmitted from the signal transmission ports XT, YT, ZT and UT to the corresponding the control signal interfaces 24, 25, 26 and 27, respectively. The servo modules 32 receive the command signals from the signal transmission ports XT, YT, ZT and UT and control the movements of the moving parts 31 on the machine 30.

Meanwhile, the sensing units 34 sense in real-time corresponding location information of the moving parts 31 and transmit the location information back to the motion controlling unit 23. The motion controlling unit 23 receives the location information through the control signal interfaces 24, 25, 26 and 27, and adjusts and processes the corresponding command signal according to the location information. The processed command signals are transmitted to the servo modules 32 through the corresponding control signal interfaces 24, 25, 26 and 27 to real-timely control, adjust and monitor the machine 30 and the movement of the moving parts 31 on the machine 30.

In summary, in the machine motion control system 100 of the exemplary embodiment, the axis control card 20 can be directly positioned on the machine 30. Thus, the machine 30 is electrically connected to the main controller 10 by only a few wires for communication therebetween. Thus, wiring connections between the axis control card 20 and the machine 30 are simple, making connection and disassembly easier, and reducing cost and complexity of the axis control card 20.

It is to be understood, however, that even though numerous characteristics and advantages of the exemplary disclosure have been set forth in the foregoing description, together with details of the structure and function of the exemplary disclosure, the disclosure is illustrative only, and changes may be made in detail, especially in matters of shape, size, and arrangement of parts within the principles of exemplary disclosure to the full extent indicated by the broad general meaning of the terms in which the appended claims are expressed.

What is claimed is:

1. A machine motion control system, comprising:
   a plurality of moving parts;
   a machine, comprising:
      a plurality of servo modules for driving and controlling the corresponding moving parts on the machine; and
      a plurality of sensing units, each sensing unit electrically connected to a corresponding moving part, the sensing units operable to sense and transmit location information of the moving parts and the machine;
   an axis control card mounted on the machine and electrically connected to the moving parts, the machine, and the plurality of sensing units, wherein the axis control card receives corresponding location information of each moving part and processes the location information to generate a corresponding command signal, and wherein the axis control card generates a command signal according to the transmitted location information and transmits the command signal to the servo modules to control and adjust the moving parts;
   wherein the axis control card further comprises a plurality of control signal interfaces, and each control signal interface is electrically connected to a corresponding sensing unit to transmit location information and the command signal;
   wherein the axis control card further comprises a motion control chip, the motion control chip comprises a group of signal transmission ports, and the signal transmission ports are respectively electrically connected to the corresponding control signal interfaces to transmit and receive the command signal; and
   wherein each signal transmission port comprises a direction signal control port, a pulse signal control port and two feedback signal receive ports, each control signal interface comprises a direction signal receive port, a pulse signal receive port, and two signal feedback ports, and the direction signal receive port and the pulse signal receive port are respectively electrically connected to the direction signal control port and the pulse signal control port, the signal feedback ports are electrically connected to the feedback signal receive ports respectively.

2. The machine motion control system as claimed in claim 1, further comprising a main controller electrically connected to the axis control card, wherein the main controller is capable of transmitting a corresponding motion instruction to the axis control card.

3. The machine motion control system as claimed in claim 2, wherein the axis control card further comprises a communication interface and a main control unit electrically connected to the main controller through the communication interface, and the main control unit is capable of receiving the motion instruction from the main controller and decoding the received motion instruction.

4. The machine motion control system as claimed in claim 3, wherein the communication interface is any of a universal serial bus interface, an institute of electrical and electronics engineers interface and an external serial ATA interface.

5. The machine motion control system as claimed in claim 3, wherein the axis control card further comprises a motion controlling unit electrically connected to the main control unit and the control signal interface, and the motion controlling unit is capable of receiving the motion instruction from the main control unit and the location information from the sensing units through the control signal interfaces, and generating corresponding command signals.

6. The machine motion control system as claimed in claim 1, wherein the servo module comprises a driver and a motor electrically connected to the driver, and the driver is electrically connected to the axis control card and transmit a driving voltage corresponding to the command signal to motor to make the motor drive the moving parts.

7. A machine motion control system, comprising:
 a plurality of moving parts;
 a machine, comprising:
  a plurality of servo modules for driving and controlling corresponding moving parts on the machine; and
  a plurality of sensing units, each sensing unit electrically connected to a corresponding moving part, the sensing units operable to sense and transmit location information of the moving parts and the machine; and
 an axis control card mounted on the machine and electrically connected to the moving parts, the machine, and the plurality of sensing units, wherein the axis control card includes a motion controlling unit, the motion controlling unit receives corresponding location information of each moving part and processes the location information to generate a corresponding command signal, and wherein the motion controlling unit generates a command signal according to the transmitted location information and transmits the command signal to the servo modules to control and adjust the moving parts;
 wherein the axis control card further comprises a plurality of control signal interfaces, and each control signal interface is electrically connected to a corresponding sensing unit to transmit location information and the command signal;
 wherein the motion controlling unit comprises a motion control chip, the motion control chip comprises a group of signal transmission ports, and the signal transmission ports are respectively electrically connected to the corresponding control signal interfaces to transmit and receive the command signal; and
 wherein each signal transmission port comprises a direction signal control port, a pulse signal control port and two feedback signal receive ports, each control signal interface comprises a direction signal receive port, a pulse signal receive port, and two signal feedback ports, and the direction signal receive port and the pulse signal receive port are respectively electrically connected to the direction signal control port and the pulse signal control port, the signal feedback ports are electrically connected to the feedback signal receive ports respectively.

8. The machine motion control system as claimed in claim 7, further comprising a main controller electrically connected to the axis control card, wherein the main controller is capable of transmitting a corresponding motion instruction to the axis control card.

9. The machine motion control system as claimed in claim 8, wherein the axis control card further comprises a communication interface and a main control unit electrically connected to the main controller through the communication interface, and the main control unit is capable of receiving the motion instruction from the main controller and decoding the received motion instruction.

10. The machine motion control system as claimed in claim 9, wherein the main control unit comprises a main control chip, the main control chip comprises a group of data ports and a group of address ports, and the data ports and the address ports are electrically connected to the motion controlling unit to transmit the processed motion instruction to the motion controlling unit.

11. The machine motion control system as claimed in claim 9, wherein the communication interface is any one of a universal serial bus interface, an institute of electrical and electronics engineers interface and an external serial ATA interface.

12. The machine motion control system as claimed in claim 9, wherein the motion controlling unit is electrically connected to the main control unit and the control signal interface, and the motion controlling unit is capable of receiving the motion instruction from the main control unit and the location information from the sensing units through the control signal interfaces to generate the command signals.

13. The machine motion control system as claimed in claim 7, wherein the servo module comprises a driver and a motor electrically connected to the driver, and the driver is electrically connected to the axis control card and transmit a driving voltage corresponding to the command signal to motor to make the motor drive the moving parts.

* * * * *